United States Patent
Dukatz et al.

(10) Patent No.: US 10,275,721 B2
(45) Date of Patent: Apr. 30, 2019

(54) QUANTUM COMPUTING MACHINE LEARNING MODULE

(71) Applicant: Accenture Global Solutions Limited, Dublin (IE)

(72) Inventors: Carl Matthew Dukatz, San Jose, CA (US); Daniel Garrison, Washington, MI (US); Lascelles Forrester, Conyers, GA (US); Corey Hollenbeck, Arlington, MA (US)

(73) Assignee: Accenture Global Solutions Limited, Dublin (IE)

( * ) Notice: Subject to any disclaimer, the term of this patent is extended or adjusted under 35 U.S.C. 154(b) by 60 days.

(21) Appl. No.: 15/491,852

(22) Filed: Apr. 19, 2017

(65) Prior Publication Data

US 2018/0308000 A1    Oct. 25, 2018

(51) Int. Cl.
*G06N 3/06*    (2006.01)
*G06N 99/00*   (2019.01)
*G06F 9/50*    (2006.01)

(52) U.S. Cl.
CPC ......... *G06N 99/005* (2013.01); *G06N 99/002* (2013.01); *G06F 9/50* (2013.01); *G06N 3/06* (2013.01)

(58) Field of Classification Search
None
See application file for complete search history.

(56) References Cited

U.S. PATENT DOCUMENTS

| | | | |
|---|---|---|---|
| 9,537,953 B1 | 1/2017 | Dadashikelayeh et al. |
| 2009/0070402 A1 | 3/2009 | Rose et al. |
| 2009/0228888 A1 | 9/2009 | Vengerov et al. |
| 2014/0298343 A1 | 10/2014 | Rajan et al. |

OTHER PUBLICATIONS

Ahamed, Quantum Recurrent Neural Networks for Filtering, Doctoral Thesis, Department of Computer Science, University of Hull, 2009, pp. 1-148.*
Ahamed, Quantum Recurrent Neural Networks for Filtering, Doctoral Thesis, Department of Computer Science, University of Hull, 2009, pp. 1-148 (Year: 2009).*

(Continued)

*Primary Examiner* — Wilbert L Starks
(74) *Attorney, Agent, or Firm* — Fish & Richardson P.C.

(57) ABSTRACT

Methods, systems, and apparatus for training a machine learning model to route received computational tasks in a system including at least one quantum computing resource. In one aspect, a method includes obtaining a first set of data, the first set of data comprising data representing multiple computational tasks previously performed by the system; obtaining input data for the multiple computational tasks previously performed by the system, comprising data representing a type of computing resource the task was routed to; obtaining a second set of data, the second set of data comprising data representing properties associated with using the one or more quantum computing resources to solve the multiple computational tasks; and training the machine learning model to route received data representing a computational task to be performed using the (i) first set of data, (ii) input data, and (iii) second set of data.

20 Claims, 5 Drawing Sheets

(56) References Cited

OTHER PUBLICATIONS

'arxiv.org' [online]. "Quantum Computation by Adiabatic Evolution," Jan. 2000 [retrieved on Aug. 28, 2017]. Retrieved from the Internet: URL <https://arxiv.org/abs/quant-ph/0001106>.

'redcedartech.com' [online]. "How to Select the Right Optimization Method for Your Problem," Aug. 21, 2010 [retrieved on Aug. 28, 2017]. Retrieved from the Internet: URL <http://www.redcedartech.com/pdfs/Select_Optimization_Method.pdf>. 2 pages.

'research.cs.wisc.edu' [online]. "Adaptive Scheduling for Master-Worker Applications on the Computational Grid," [retrieved on Aug. 28, 2017]. Retrieved from the Internet: URL http://research.cs.wisc.edu/htcondor/doc/camera.pdf.

EP Search Report and Written Opinion in European Application No. 18161882.8, dated Sep. 6, 2018, 10 pages.

Hongzai Mao et al., "Resource management with deep reinforcement learning", $15^{th}$ ACM Workshop on Hot Topics in Networks, Hotnets '16, Nov. 9, 2016, 7 pages.

* cited by examiner

QUANTUM COMPUTING MACHINE LEARNING MODULE

BACKGROUND

For some computational tasks, quantum computing devices may offer a computational speed up compared to classical devices. For example, quantum computers may achieve a speed up for tasks such as database search, evaluating NAND trees, integer factorization or the simulation of quantum many-body systems.

As another example, adiabatic quantum annealers may achieve a computational speed up compared to classical annealers for some optimization tasks. To perform an optimization task, quantum hardware may be constructed and programmed to encode the solution to a corresponding optimization task into an energy spectrum of a many-body quantum Hamiltonian characterizing the quantum hardware. For example, the solution is encoded in the ground state of the Hamiltonian.

SUMMARY

This specification describes a machine learning module that may be used to route received computational tasks to one or more quantum computing devices or one or more classical computing devices. The machine learning module uses machine learning techniques to determine when and how to leverage the power of quantum computing.

In general, one innovative aspect of the subject matter described in this specification can be implemented in a computer implement method for training a machine learning model to route received computational tasks in a system including at least one quantum computing resource, the method including the actions of: obtaining a first set of data, the first set of data comprising data representing multiple computational tasks previously performed by the system; obtaining a second set of data, the second set of data comprising data representing properties associated with using the one or more quantum computing resources to solve the multiple computational tasks; obtaining input data for the multiple computational tasks previously performed by the system, comprising data representing a type of computing resource the task was routed to; and training the machine learning model to route received data representing a computational task to be performed using the (i) first set of data, (ii) input data, and (iii) second set of data.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the quantum computing resources comprise one or more of (i) quantum gate computers, (ii) adiabatic annealers, or (iii) quantum simulators.

In some implementations the system further comprises one or more classical computing resources.

In some implementations the computational tasks comprise optimization tasks.

In some implementations properties of using the one or more quantum computing resources to solve the multiple computational tasks comprise, for each computational task, one or more of: (i) approximate qualities of solutions generated by the one or more quantum computing resources; (ii) computational times associated with solutions generated by the one or more quantum computing resources; or (iii) computational costs associated with solutions generated by the one or more quantum computing resources.

In some implementations data representing properties of using the one or more quantum computing resources to solve multiple computational tasks further comprises, for each quantum computing resource, one or more of (i) a number of qubits available to the quantum computing resource; and (ii) a cost associated with using the quantum computing resource.

In some implementations the obtained input data for the multiple computational tasks previously performed by the system further comprises, for each computational task, one or more of: (i) data representing a size of an input data set associated with the computational task; (ii) data indicating whether an input data set associated with the computational task comprised static, real time or both static and real time input data; (iii) data representing an error tolerance associated with the computational task; and (iv) data representing a required level of confidence associated with the computational task.

In some implementations the obtained input data for the multiple computational tasks previously performed by the system further comprises data indicating a frequency of changes to the input data sets associated with each computational tasks.

In some implementations training the machine learning model to route received computational tasks comprises: generating a set of training examples using the (i) first set of data, (ii) input data, and (iii) second set of data, wherein each training example comprises a machine learning model input paired with a known machine learning model output; and training the machine learning model using the set of training examples.

In general, another innovative aspect of the subject matter described in this specification can be implemented in a computer implement method for obtaining a solution to a computational task, the method comprising: receiving data representing a computational task to be performed by a system including one or more quantum computing resources and one or more classical computing resources; processing the received data using a machine learning model to determine which of the one or more quantum computing resources or the one or more classical computing resources to route the data representing the computational task to, wherein the machine learning model has been configured through training to route received data representing computational tasks to be performed in a system including at least one quantum computing resource; and routing the data representing the computational task to the determined computing resource to obtain, from the determined computing resource, data representing a solution to the computational task.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations the quantum computing resources comprise one or more of (i) quantum gate computers, (ii) adiabatic annealers, or (iii) quantum simulators.

In some implementations the computational tasks comprise optimization tasks.

In some implementations training the machine learning model to route received data representing computational tasks to be performed comprises training the machine learning model using (i) data representing multiple computational tasks previously performed by the system, and (ii) data representing a type of computing resource the task was routed to.

In some implementations the data representing multiple computational tasks previously performed by the system comprises, for each computational task, one or more of: (i) data representing a size of an input data set associated with the computational task; (ii) data indicating whether an input data set associated with the computational task comprised static, real time or both static and real time input data; (iii) data representing an error tolerance associated with the computational task; and (iv) data representing a required level of confidence associated with the computational task.

In some implementations the data representing multiple computational tasks previously performed by the system comprises data indicating a frequency of changes to input data sets associated with each computational tasks.

In some implementations the method further comprises training the machine learning model using data representing properties associated with using the one or more quantum computing resources to solve the multiple computational tasks.

In some implementations properties associated with using the one or more quantum computing resources to solve the multiple computational tasks comprise: for each computational task, one or more of: (i) approximate qualities of solutions generated by the one or more quantum computing resources; (ii) computational times associated with solutions generated by the one or more quantum computing resources; or (iii) computational costs associated with solutions generated by the one or more quantum computing resources, and for each quantum computing resource, one or more of (i) a number of qubits available to the quantum computing resource; and (ii) a cost associated with using the quantum computing resource.

The subject matter described in this specification can be implemented in particular ways so as to realize one or more of the following advantages.

For some optimization tasks, quantum computing devices may offer an improvement in computational speed compared to classical devices. For example, quantum computers may achieve an improvement in speed for tasks such as database search or evaluating NAND trees. As another example, quantum annealers may achieve an improvement in computational speed compared to classical annealers for some optimization tasks. For example, determining a global minimum or maximum of a complex manifold associated with the optimization task is an extremely challenging task. In some cases, using a quantum annealer to solve an optimization task can be an accurate and efficient alternative to using classical computing devices.

Conversely, for some optimization tasks, quantum computing devices may not offer an improvement compared to classical devices. For example, whilst quantum computing devices may offer computational speedups for some computational tasks, the costs associated with using the quantum devices to perform the computational tasks may be higher than the costs associated with using classical computing devices to perform the computational tasks. Such costs can include computational costs, i.e., the cost of resources required to build and use a computing device, and financial costs, i.e., monetary costs and fees of renting computational time on an external computing resource. Therefore, a tradeoff between the benefits of using quantum computing resources and classical computing resources exists.

A quantum computing machine learning module, as described in this specification, balances this tradeoff and learns optimal routings of computational tasks to classical or quantum computing resources. By learning when and how to utilize the power of quantum computing, a system implementing the quantum computing machine learning module may perform computational tasks more efficiently and/or accurately compared to systems that do not include quantum computing resources, or to systems that do not learn optimal routings of computational tasks to classical or quantum resources.

In addition, a quantum computing module, as described in this specification, can adapt overtime as more efficient quantum and classical systems are introduced. For example, while current implementations of quantum computations or current quantum hardware may include a significant classical overhead, e.g., leverages classical computing capabilities, well founded evidence supports that future quantum computing hardware will be able to perform exponentially more challenging tasks in less time that current quantum computing hardware or classical computing hardware. Conversely, as classical computers continue to be horizontally scalable, the additional capacity made available for computation will be factored into the machine learning to determine the best use of resources.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
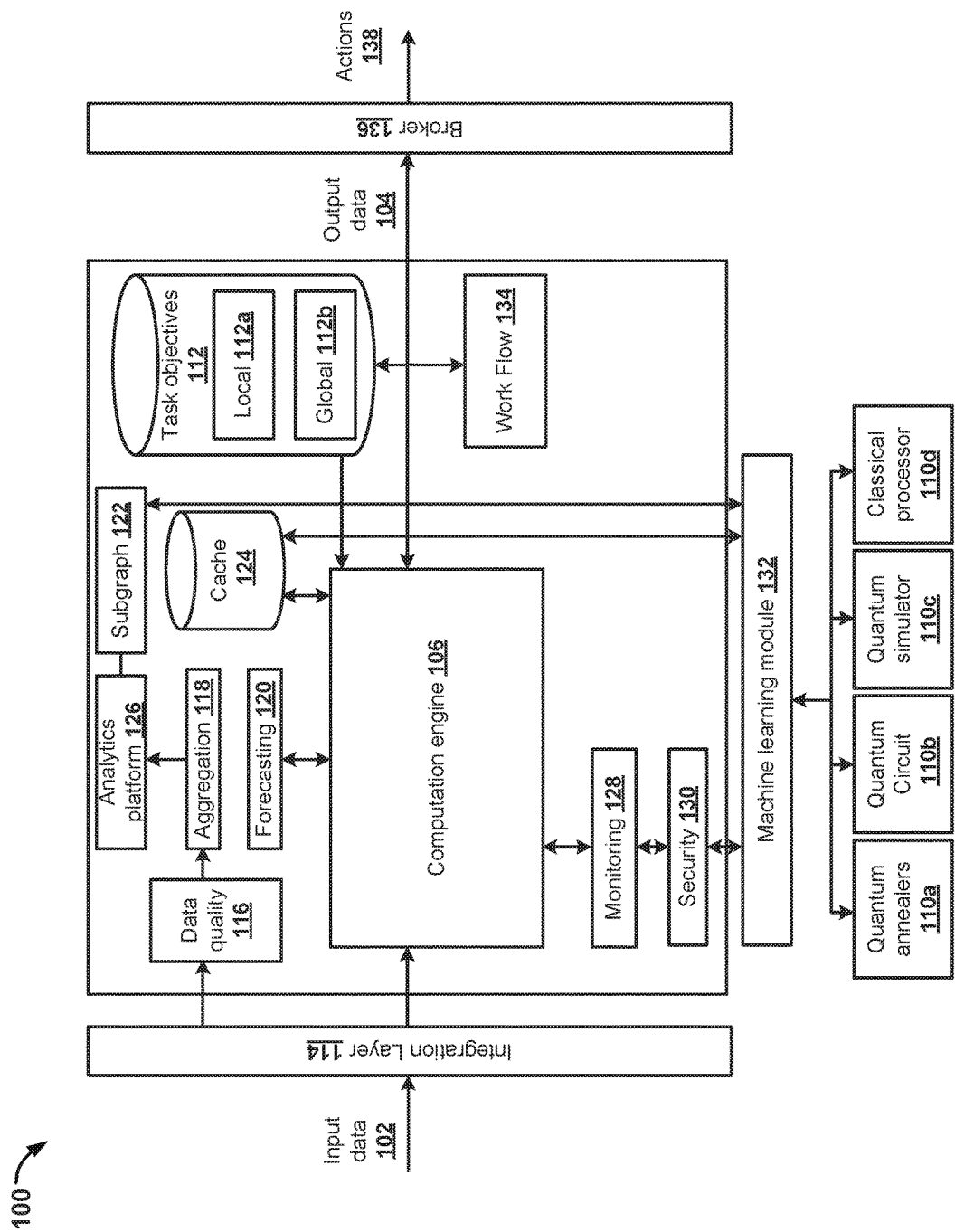
FIG. 1A depicts an example system for performing computational tasks.

For some computational tasks, quantum computing devices may offer a computational speed up compared to classical devices. For example, quantum computers may achieve a polynomial speed up for tasks such as database search or evaluating NAND trees. As another example, adiabatic quantum annealers may achieve a computational speed up compared to classical annealers for some optimization tasks.

However, such quantum computers or quantum annealers may not be universally applied to any computational task—for example, in the case of quantum annealers, a computational task is designed around the quantum annealer, rather than the quantum annealer being designed around the computational task. Furthermore, in some cases a computational task may be too complex to implement using quantum devices, or may require a large classical overhead, meaning that using the quantum device to solve the computational task is either slower or more costly than using a classical device to solve the computational task.

This specification provides systems and methods for determining when and how to leverage quantum computing devices when solving computational tasks. A system can receive computational tasks, e.g., optimization tasks, to be performed. For example, the system may be an optimization engine that is configured to receive input data and to generate, as output, an optimal solution to an optimization task based on the received input data. The received input data can include static and real-time data.

The system outsources computations associated with the received computational tasks to one or more external devices. In some cases the system may preprocess the computational tasks before outsourcing the tasks, e.g., including separating a received computational task into one or more sub tasks. The external devices can include quantum computing devices, e.g., quantum annealers, quantum simulators or quantum gate computers, and classical computing devices, e.g., standard classical processors or supercomputers.

The system decides when and where to outsource computations associated with the received computational tasks. Such task routing may be a complex problem that is dependent on many factors. The system is trained to learn optimal routings of received computational tasks using a set of training data. The training data includes data from several sources, as described below, which may be used to generate multiple training examples. Each training example can include (i) input data relating to a previous computational task, e.g., data specifying the task, size/complexity of the task, restrictions for solving the task, error tolerance, (ii) information relating to which device was used to solve the task, or (iii) metrics indicating a quality of the solution obtained using the device, e.g., a level of confidence in the solution, computational time taken to generate the solution, or computational costs incurred.

Other data may be included in the training data, including an indication of the computational resources available when processing the previous computational tasks, a number of qubits used in the quantum devices, ability of algorithms running on the quantum devices or classical devices to process the problem, costs of using the classical or quantum devices, or reliability of classical or quantum devices.

In some cases the system learns to adapt the routings of computational tasks based on traffic flow in the system, e.g., if many computational tasks are received, the machine learning module may learn to prioritize certain tasks or subtasks, or learn when it is more efficient to wait for a particular device to become available again or when it is more efficient to route a task to a second-choice device.

Training can include applying conventional machine learning techniques, such as computing a loss function and backpropagating gradients. Once the machine learning module has been trained, it may be used at runtime for inference, e.g., to receive new computational tasks to be performed and to find an improved routing of the computational tasks in order to obtain solutions to the received tasks.

Example Operating Environment

FIG. 1A depicts an example system 100 for performing computational tasks. The system 100 is an example of a system implemented as computer programs on one or more computers in one or more locations, in which the systems, components, and techniques described below can be implemented.

The system 100 for performing computational tasks is configured to receive as input data representing a computational task to be solved, e.g., input data 102. For example, in some cases the system 100 may be configured to solve multiple computational tasks, e.g., including optimization tasks, simulation tasks, arithmetic tasks, database search, machine learning tasks, or data compression tasks. In these cases, the input data 102 may be data that specifies one of the multiple computational tasks. The input data 102 representing the computational task to be solved may specify one or more properties of the computational task. For example, in cases where the computational task is an optimization task, the input data 102 may include data representing parameters associated with the optimization task, e.g., parameters over which an objective function representing the optimization task is to be optimized, and one or more values of the parameters.

In some cases the input data 102 may include static input data and dynamic input data, e.g., real-time input data. As an example, the input data 102 may be data that represents the task of optimizing the design of a water network in order to optimize the amount of water distributed by the network. In this example, the input data 102 may include static input data representing one or more properties of the water network, e.g., a total number of available water pipes, a total number of available connecting nodes or a total number of available water tanks. In addition, the input data 102 may include data representing one or more parameters associated with the optimization task, e.g., level of water pressure in each pipe, level of water pressure at each connecting node, height of water level in each water tank, concentration of chemicals in the water throughout the network, water age or water source. Furthermore, the input data 102 may include dynamic input data representing one or more current properties or values of parameters of the water network, e.g., a current number of water pipes in use, a current level of water pressure in each pipe, a current concentration of chemicals in the water, or a current temperature of the water.

In some implementations, the input data 102 may further include data specifying one or more task objectives associated with the computational task. The task objectives may include local task objectives and global task objectives. Local task objectives may include local targets to be considered when solving the computational task, e.g., local objectives of a solution to the computational task. For example, local objectives may include constraints on values of subsets of computational task variables. Global task objectives may include global targets to be considered when solving the computational task, e.g., global objectives of a solution to the computational task.

For example, continuing the above example of the task of optimizing a water network, the input data 102 may further include data specifying local task objectives such as a constraint on the concentration of chemicals in the water, e.g., constraining the chemical concentration to between 0.2% and 0.5%, and on the number of water pipes in use, e.g., constraining the total number of water pipes to less than 1000. Another example local task objective may be to optimize a particular portion of the water network. In addition, the input data 102 may further include data specifying global task objectives such as one or more global targets, e.g., a target of keeping water wastage to below 2% or a target of distributing at least 10 million gallons of water per day.

In other implementations, data specifying one or more task objectives associated with the computational task may be stored in the system 100 for performing computational tasks, e.g., in task objective data store 112. For example, as described above, the system 100 for performing computational tasks may be configured to solve multiple computational tasks and the input data 102 may be data that specifies one of the multiple computational tasks. In this example, the system 100 for performing computational tasks may be configured to store task objectives corresponding to each computational task that it is configured to perform. For convenience, data specifying one or more task objectives associated with the computational task is described as being stored in task objective data store 112 throughout the remainder of this document.

The system 100 for performing computational tasks is configured to process the received input data 102 to generate output data 104. In some implementations, the generated output data 104 may include data representing a solution to the computational task specified by the input data 102, e.g., a global solution to the computational task based on one or more global task objectives 112$b$.

Figure 1B:
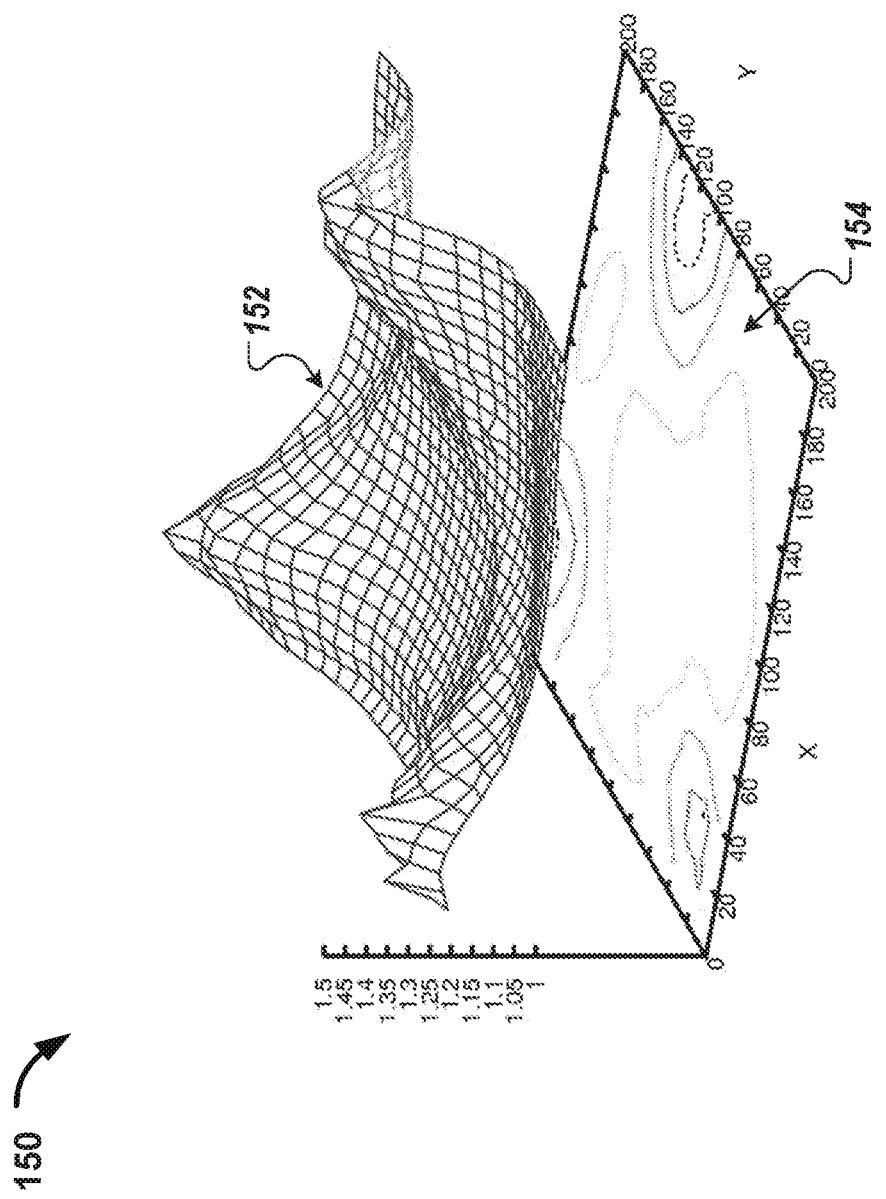
FIG. 1B depicts an example visualization of a global search space and local search space.

In other implementations or in addition, the output data 104 may include data representing one or more local solutions to the computational task, e.g., one or more initial solutions to the optimization task that are based on local task objectives 112$a$ and global task objectives 112$b$. Local solutions to the optimization task may include solutions to sub tasks of the optimization task. For example, local solutions may include solutions that are optimal over a subset of the parameters associated with the optimization task, e.g., where the subset is specified by the local task objectives 112$a$. That is, local solutions may include solutions that are optimal over a subspace, or local space, of a global search space or the optimization task. For example, a local space may be the result of a projection of a multi-dimensional spline representing the global search space to a two-dimensional base space. An example visualization of a global search space and local space 150 is shown in FIG. 1B. In FIG. 1B, multi-dimensional spline 152 represents a global search space, and two-dimensional base space 154 represents a local space.

As another example, in cases where the optimization task is a separable task, e.g., a task that may be written as the sum of multiple sub tasks, local solutions may include optimal solutions to each of the sub tasks in the sum of sub tasks, e.g., where the sub tasks are specified by the local task objectives 112$a$.

For example, continuing the above example of the task of optimizing a water network, the output data 104 may include data representing a globally optimal configuration (with respect to global task objectives, e.g., wastage targets and distribution targets) of the above described parameters associated with the water network optimization task. Alternatively or in addition, the output data 104 may include data representing multiple local solutions to the water network optimization task, e.g., data specifying an optimal number of water pipes to use, an associated water pressure in each pipe, or a concentration of chemicals in the water flowing through the network. In some implementations, parameter values specified by local solutions may be the same as parameter values specified by a global solution. In other implementations, parameter values specified by local solutions may differ from parameter values specified by a global solution, e.g., a local solution may suggest a chemical concentration of 0.4%, whereas a global solution may suggest a chemical concentration of 0.3%.

The output data 104 may be used to initiate one or more actions associated with the optimization task specified by the input data 102, e.g., actions 138. For example, continuing the above example of the task of optimizing a water network, the output data 104 may be used to adjust one or more parameters in the water network, e.g., increase or decrease a current water chemical concentration, increase or decrease a number of water pipes in use, or increase or decrease one or more water pipe pressures.

Optionally, the system 100 for performing computational tasks may include an integration layer 114 and a broker 136. The integration layer 114 may be configured to manage received input data, e.g., input data 102. For example, the integration layer 114 may manage data transport connectivity, manage data access authorization, or monitor data feeds coming into the system 100.

The broker 136 may be configured to receive output data 104 from the system 100 for performing optimization tasks and to generate one or more actions to be taken, e.g., actions 138. The actions may include local actions, e.g., adjustments to a subset of optimization parameters, which contribute towards achieving local and global targets of the optimization task.

The system 100 for performing computational tasks includes a computation engine 106. The computation engine 106 is configured to process the received data to obtain solutions to the computational task. The obtained solutions may include a global solution to the computational task that is based on one or more global task objectives 112$b$. Alternatively or in addition, the obtained solutions may include one or more initial solutions to the optimization task that are based on the one or more local task objectives 112$a$, e.g., one or more local solutions to the computational task. In some implementations, the computation engine 106 may process received input data to obtain one or more initial solutions to the optimization task that are based on local task objectives 112$a$, then further process the one or more initial solutions to the optimization task to generate a global solution to the optimization task based on the global task objectives 112$b$.

The computation engine 106 may be configured to process received data using one or more computing resources included in the computation engine 106 or otherwise included in the system 100 for performing computational tasks. In other implementations, the computation engine 106 may be configured to process received data using one or more external computing resources, e.g., additional computing resources 110$a$-110$d$. For example, the computation engine 106 may be configured to analyze the received input data 102 representing the computational task to be solved and the data representing corresponding task objectives 112a and 112b, and outsource one or more computations associated with solving the computational task based on the task objectives 112a and 112b to the additional computing resources 110a-110d.

The additional computing resources 110a-110d may include quantum annealer computing resources, e.g., quantum annealer 110a. A quantum annealer is a device configured to perform quantum annealing—a procedure for finding the global minimum of a given objective function over a given set of candidate states using quantum tunneling. Quantum tunneling is a quantum mechanical phenomenon where a quantum mechanical system overcomes localized barriers in the energy landscape which cannot be overcome by classically described systems.

The additional computing resources 110a-110d may include one or more quantum gate processors, e.g., quantum gate processor 110b. A quantum gate processor includes one or more quantum circuits, i.e., models for quantum computation in which a computation is performed using a sequence of quantum logic gates, operating on a number of qubits (quantum bits).

The additional computing resources 110a-110d may include one or more quantum simulators, e.g., quantum simulator 110c. A quantum simulator is a quantum computer that may be programmed to simulate other quantum systems and their properties. Example quantum simulators include experimental platforms such as systems of ultracold quantum gases, trapped ions, photonic systems or superconducting circuits.

The additional computing resources 110a-110d may include one or more classical processors, e.g., classical processor 110d. In some implementations, the one or more classical processors, e.g., classical processor 110d, may include supercomputers, i.e., computers with high levels of computational capacity. For example, the classical processor 110d may represent a computational system with a large number of processors, e.g., a distributed computing system or a computer cluster.

The system 100 for performing computational tasks includes a machine learning module 132 that is configured to learn which, if any, computations to route to the additional computing resources 110a-110d. For example, the machine learning module 132 may include a machine learning model that may be trained using training data to determine when and where to outsource certain computations. The training data may include labeled training examples, e.g., a machine learning model input paired with a respective known machine learning model output, where each training example includes data from multiple resources, as described in more detail below. The machine learning model may process each machine learning model input to generate a respective machine learning model output, compute a loss function between the generated machine learning model output and the known machine learning model, and backpropagate gradients to adjust machine learning model parameters from initial values to trained values. An example machine learning module is described in more detail below with reference to FIG. 2. Training a machine learning model to route received computations to one or more external computing resources is described in more detail below with reference to FIG. 4.

The system 100 for performing computational tasks includes a cache 124. The cache 124 is configured to store different types of data relating to the system 100 and to computational tasks performed by the system 100. For example, the cache 124 may be configured to store data representing multiple computational tasks previously performed by the system 100. In some cases the cache 124 may be further configured to store previously generated solutions to computational tasks that the system 100 has previously solved. In some cases this may include solutions to a same computational task, e.g., with different task objectives or different dynamic input data. In other cases this may include solutions to different computational tasks. The cache 124 may be configured to store previously generated solutions to previously received computational tasks from within a specified time frame of interest, e.g., solutions generated within the last 24 hours.

The cache 124 may also be configured to label previously generated solutions. For example, a previously generated solution may be labelled as a successful solution if the solution was generated within a predetermined acceptable amount of time, and/or if a cost associated with generating the solution was lower than a predetermine threshold. Conversely, a previously generated solution may be labelled as an unsuccessful solution if the solution was not generating within a predetermined acceptable amount of time, and/or if a cost associated with generating the solution was higher than a predetermine threshold. Labelling the solution as successful or unsuccessful may include storing data representing the cost associated with generating the solution or data representing a time taken to generate the solution. Such information may be provided for input into the machine learning module 132. In some cases stored unsuccessful data may be cleaned from the cache 124, e.g., to free storage space for data representing newly generated solutions.

The cache 124 may also be configured to store system input data associated with the multiple computational tasks previously performed by the system. For example, the input data may include data representing a type of computing resource that each computational task was routed to. In addition, the input data associated with the multiple computational tasks previously performed by the system may further include, for each computational task, one or more of: (i) data representing a size of an input data set associated with the computational task, (ii) data indicating whether an input data set associated with the computational task comprised static, real time or both static and real time input data, (iii) data representing an error tolerance associated with the computational task, or (iv) data representing a required level of confidence associated with the computational task. In some implementations, the cache 124 may further store data indicating a frequency of changes to input data sets associated with each computational tasks. Examples of the different types of input data stored in the cache 124 are described in more detail below with reference to FIG. 3.

Optionally, the system 100 for performing computational tasks may include a monitoring module 128. The monitoring module 128 is configured to monitor interactions between and transactions to and from the one or more additional computing resources 110a-d. For example, the monitoring module 128 may be configured to detect failed or stuck calls to one or more of the additional computing resources 110a-d. Example failures that can cause a call to one or more of the additional computing resources 110a-d to fail or get stuck include issues with a transport layer included in the system 100, i.e., issues with data being moved through the cloud, security login failures, or issues with the additional computing resources 110a-d themselves such as performance or availability of the additional computing resources 110a-d. The monitoring module 128 may be configured to process detected failed or stuck calls to one or more of the additional computing resources 110a-d and determine one or more corrective actions to be taken by the system 100 in response to the failed or stuck calls. Alternatively, the monitoring module 128 may be configured to notify other components of the system 100, e.g., the global optimization engine 106 or machine learning module 132, of detected failed or stuck calls to one or more of the additional computing resources 110a-d.

For example, if one or more computations are outsourced to a particular quantum computing resource, however the particular quantum computing resource suddenly becomes unavailable or is processing outsourced computations too slowly, the monitoring module 128 may be configured to notify relevant components of the system 100, e.g., the machine learning module 132. The machine learning module 132 may then be configured to determine one or more suggested corrective actions, e.g., instructing the system 100 to outsource the computation to a different computing resource or to retry the computation using the same computing resource. Generally, the suggested corrective actions may include actions that keep the system 100 successfully operating in real time, e.g., even when resource degradations outside of the system 100 are occurring.

Optionally, the system 100 for performing computational tasks may include a security component 130. The security component 130 is configured to perform operations relating to the security of the system 100. Example operations include, but are not limited to, preventing system intrusions, detecting system intrusions, providing authentication to external systems, encrypting data received by and output by the system 100, and preventing and/or remedying denial of service (DoS).

Optionally, the system 100 for performing computational tasks may include a subgraph module 122. The subgraph module 122 may be configured to partition a computational task into multiple sub tasks. For example, the subgraph module 122 may be configured to analyze data specifying a computational task to be solved, and to map the computational task to multiple minimally connected subgraphs. The minimally connected subgraphs may be provided to the computation engine 106 for processing, e.g., to be routed to the additional computing resources 110a-110d via the machine learning module 132.

During operation, the computation engine 106 may be configured to query the cache 124 to determine whether existing solutions to a received computational task exists in the cache. If it is determined that existing solutions do exist, the computation engine 106 may retrieve the solutions and provide the solutions directly as output, e.g., as output data 104. If it is determined that existing solutions do not exist, the computation engine 106 may process the received data as described above.

In some implementations, the system 100 may be configured to determine whether a solution to a similar optimization task is stored in the cache 124. For example, the system 100 may be configured to compare a received optimization task to one or more other optimization tasks, e.g., optimization tasks that have previously received by the system 100, and determine one or more respective optimization task similarity scores. If one or more of the determined similarity scores exceed a predetermined similarity threshold, the system 100 may determine that the optimization task is similar to another optimization task, and may use a previously obtained solution to the optimization task as an initial solution to the optimization task, or as a final solution to the optimization task. In some cases similarity thresholds may be predetermined as part of an initial learning and parameter configuration process.

Optionally, the system 100 for performing computational tasks may include a forecasting module 120. The forecasting module 120 forecasts future global solutions and their impact on data entering the system 100, e.g., their impact on future input data 102. In some implementations the forecasting module 120 may be configured to forecast future global solutions within a remaining time of a particular time frame of interest, e.g., for the next 10 hours of a current 24 hour period.

For example, the forecasting module 120 may include forecast data from historical periods of time. Forecast data may be compared to current conditions and optimization task objectives to determine whether a current optimization task and corresponding task objectives are similar to previously seen optimization tasks and corresponding task objectives. For example, the system 100 may include forecast data for a period of interest, e.g., a 24 hour period of interest on a particular day of the week. In this example, on a similar day of the week at a later time, the system 100 may use forecast data for the period of interest to determine whether conditions and optimization task objectives for the current period of interest is similar to the conditions and optimization task objectives for the previous period of interest. If it is determined that the conditions and optimization task objectives for the current period of interest is similar to the conditions and optimization task objectives for the previous period of interest, the system 100 may leverage previous results of previously seen optimization tasks as future forecast data points until the forecast data points are replaced by real results from current calculations.

As another example, the forecasting module 120 may be configured to receive real time input data that may be used to forecasts future global solutions and their impact on data entering the system 100. For example, current weather conditions may be used to forecast future global solutions to optimization tasks related to water network optimization or precision agriculture.

Optionally, the system 100 for performing computational tasks may include a data quality module 116. The data quality module 116 is configured to receive the input data 102 and to analyze the input data 102 to determine a quality of the input data 102. For example, the data quality module 116 may score the received input data 102 with respect to one or more data quality measures, e.g., completeness, uniqueness, timeliness, validity, accuracy or consistency. For example, in some implementations the system 100 may be configured to receive a data feed from an internet of things (IoT) sensor, e.g., that tracks the position of an object or entity within an environment. If the data quality module 116 determines that one of these objects or entities has moved an unrealistic distance in a particular period of time, the data quality module 116 may determine that the quality of the received data feed is questionable and that the data feed may need to be further analyzed or suspended.

Each measure may be associated with a respective predetermined score threshold that may be used to determine whether data is of acceptable quality or not. For example, the data quality module 116 may determine that the input data 102 is of an acceptable quality if the scored input data 102 exceeds a majority of the predetermined score thresholds.

If it is determined that the input data 102 is of an acceptable quality, the data quality module 116 may be configured to provide the input data 102 to an aggregation module 118. The aggregation module 118 is configured to receive repeated data inputs, e.g., including input data 102, and to combine the data inputs. The aggregation module 118 may be configured to provide combined data inputs to other components of the system 100. For example, in some implementations the system 100 may include an IoT sensor that receives input data readings every 500 ms. Typically, the system 100 or an optimization task corresponding to the input data readings may only require that input data readings be received every 5 seconds. Therefore, in this example, the aggregation module 118 may be configured to combine and aggregate the input readings in order to generate a simpler data input. In some cases this may improve the efficiency of downstream calculations performed by the system 100.

If it is determined that the input data 102 is not of an acceptable quality the data quality module 116 may be configured to instruct the system 100 to process an alternative data input, e.g., a data input that is an average from previous data inputs or extrapolated from the current data stream. Alternatively, if the accuracy of a particular data input is determined to be critical to the system's ability to perform one or more computations, the data quality module 116 may be configured to enter an error condition. In these examples, the data quality module 116 may learn when and how to instruct the system 100 to process alternative data inputs through a machine learning training process.

Optionally, the system 100 may include an analytics platform 126. The analytics platform 126 is configured to process received data, e.g., input data 102 or data representing one or more local or global solutions to an optimization task, and provide analytics and actionable insights relating to the received data.

Optionally, the system 100 may include a workflow module 134. The workflow module 134 may be configured to provide a user interface for assigning values to optimization task parameters, defining optimization task objectives, and managing the learning process by which the system 100 may be trained. The workflow module 134 may be further configured to allow for users of the system 100 to coordinate on complex objective-related tasks such that the system 100 may be used efficiently. The workflow module 134 may also be configured to allow for various levels of role-based access controls. For example, the workflow module 134 may be configured to allow a junior team member to modify some of the task objectives, but keeps them from modifying critical ones. In this manner, the workflow module 134 may reduce the likelihood that critical undesirable actions, such as the opening of large water mains in a water network, are avoided.

Figure 2:
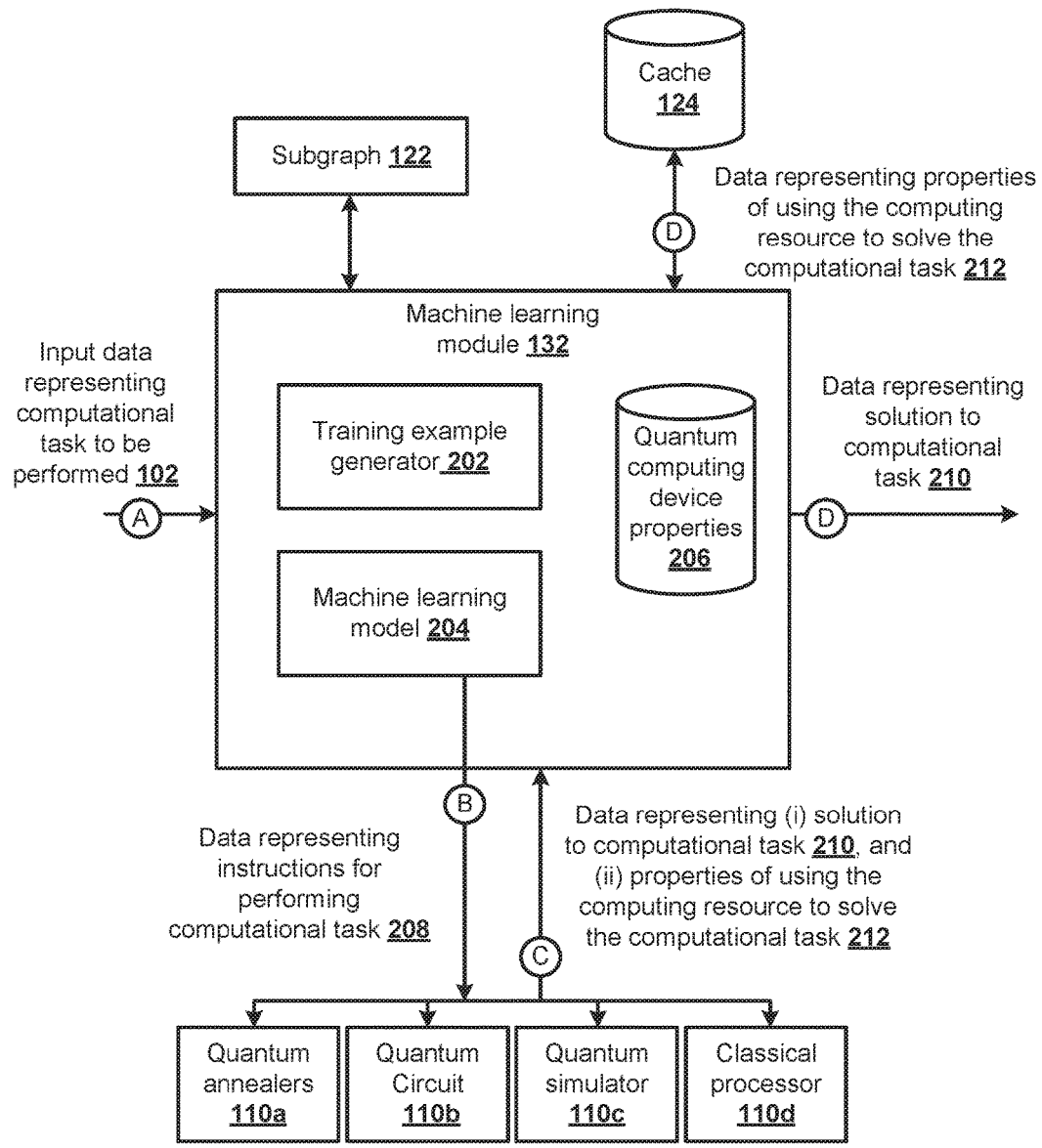
FIG. 2 depicts an example quantum computing machine learning module.

FIG. 2 depicts an example machine learning module 132, as introduced above with reference to FIG. 1A. The example machine learning module 132 includes a training example generator 202, machine learning model 204 and a database 206. As described above with reference to FIG. 1A, the machine learning module 132 is in communication with at least one or more additional computing resources 110a-110d, a cache 124 and a subgraph component 122.

The machine learning model 204 is a predictive model that may be trained to perform one or more machine learning tasks, e.g., classification tasks. For example, the machine learning model 204 may be an artificial neural network, e.g., a deep neural network such as a recurrent neural network, a decision tree, support vector machine or Bayesian network. The machine learning module 132 will support multiple software for the machine learning models 204 based on the environment scale and runtime, e.g. for a large distributed environment the model could be in C, for a cloud based implementation the model could be in R, and for a small environment the model could be in Python.

The machine learning module 132 is configured to train the machine learning model 204 to route computations or sub-computations received by the machine learning module 132 to the one or more additional computing resources 110a-110d. The machine learning module 132 is configured to train the machine learning model 204 using a set of training examples generated by the training example generator 202 and using data stored in the database 206.

The database 206 is configured to store data representing properties associated with using the one or more additional computing resources 110a-110d, e.g., one or more quantum computing resources, to solve the multiple computational tasks. For example, properties of using the one or more additional computing resources 110a-110d to solve the multiple computational tasks may include, for each computational task, one or more of (i) approximate qualities of solutions generated by the one or more additional computing resources 110a-110d, (ii) computational times associated with solutions generated by the one or more additional computing resources 110a-110d, or (iii) computational costs associated with solutions generated by the one or more additional computing resources 110a-110d. In the cases where the additional computing resources are quantum computing resources, the properties of using the one or more quantum computing resources to solve multiple computational tasks may include, for each quantum computing resource, one or more of (i) a number of qubits available to the quantum computing resource, and (ii) a cost associated with using the quantum computing resource.

The training example generator may be configured to access the database 206 and cache 124 to generate the set of training examples. For example, the training example generator may be configured to generate a set of training examples using (i) data representing multiple computational tasks previously performed by the system, (ii) input data for the multiple computational tasks previously performed by the system, including data representing a type of computing resource the task was routed to, and (iii) data representing properties associated with using the one or more quantum computing resources to solve the multiple computational tasks. A process for training a machine learning model 204 to route received computational tasks or sub tasks to one or more additional computing resources 110a-110d is described in more detail below with reference to FIG. 4.

Once the machine learning model 204 has been trained to route received computational tasks to the one or more additional computing resources 110a-110d, during operation (A), the machine learning module 132 is configured to receive input data 102 specifying a computational task to be solved. Optionally, the input data 102 may further include data representing one or more properties of the computational task and parameters of the computational task, as described above with reference to FIG. 1A. The input data may include static data and dynamic data. In some implementations the machine learning module 132 may be configured to receive the input data 102 directly, e.g., in a form in which the input data 102 was provided to the system 100 for performing computational tasks as described above with reference to FIG. 1A. In other implementations the machine learning module 132 may be configured to receive the input data 102 from another component of the system 100 for performing computational tasks, e.g., from an integration layer 114 or data quality module 116.

In some implementations, the machine learning module 132 may be configured to partition the computational task into one or more sub tasks. For example, as described above with reference to FIG. 1A, the machine learning module may be in data communication with a subgraph component 122 of the system 100 for performing computational tasks, and may be configured to provide the subgraph component 122 with data representing the computational task, and to receive data representing multiple minimally connected sub graphs representing sub tasks of the computational task.

The machine learning module 132 is configured to provide data representing the computational task or computational sub tasks to the trained machine learning model 204. The machine learning model 204 is configured to process the received data and to determine which of the one or more additional computing resources 110a-110d to route the received data representing the computational task or sub tasks to. Although not illustrated in FIG. 2, in some implementations the machine learning model 204 may determine that the received data should not be routed to the additional computing resources 110a-110d, and that the computation engine 106 of FIG. 1A should process the received data in order to obtain a solution to the computational task or sub tasks.

During operation (B), the machine learning model 204 is configured to provide the determined additional computing resource or resources with instructions for performing the respective computational task or computational sub tasks, e.g., data 208. For example, the machine learning model 204 may determine that a received optimization task should be routed to a quantum annealer, e.g., quantum annealer 110a. In this example, during operation (B), the machine learning model 204 may provide the quantum annealer 110a with instructions for performing the optimization task. As another example, the machine learning model 204 may determine that a received simulation task should be routed to a quantum simulator, e.g., quantum simulator 110c. In this example, during operation (B), the machine learning model 204 may provide the quantum simulator 110c with instructions for performing the simulation task. In some implementations, the machine learning model may provide multiple determined additional computing resources with instructions for performing multiple respective computational tasks or computational sub tasks in parallel.

During operation (C), the machine learning module 132 is configured to receive data representing a solution to computational task, e.g., data 210, and data representing properties of using the corresponding computing resource to solve the computational task, e.g., data 212. For example, data representing properties of using the corresponding computing resource to solve the computational task may include data representing an approximate quality of the generated solution, a computational time associated with the generated solution, or a computational cost associated with the generated solution. In some implementations, the machine learning model may receive data representing multiple solutions to multiple computational tasks and data representing properties of using the corresponding computing resources to solve the multiple computational tasks in parallel.

During operation (D), the machine learning module 132 may be configured to directly provide data representing an obtained solution to the computational task as output, e.g., as output data 210. In other implementations, the machine learning module 132 may be configured to first process received data representing solutions to sub tasks of the computational task in order to generate an overall solution to the computational task. The machine learning module 132 may then provide data representing the overall solution to the computational task as output. The data representing the obtained solution to the computational task as output may be provided as output from the system 100, or to a broker component 136, as described above with reference to FIG. 1A, In addition, during operation (D), the machine learning module 132 may be configured to provide the data representing properties of using the corresponding computing resource to solve the computational task, e.g., data 212, to the cache 124. In this manner, the cache 124 may be regularly updated and used to generate updated training examples, e.g., for retraining or fine tuning the machine learning model 204.

Programming the Hardware

Figure 3:
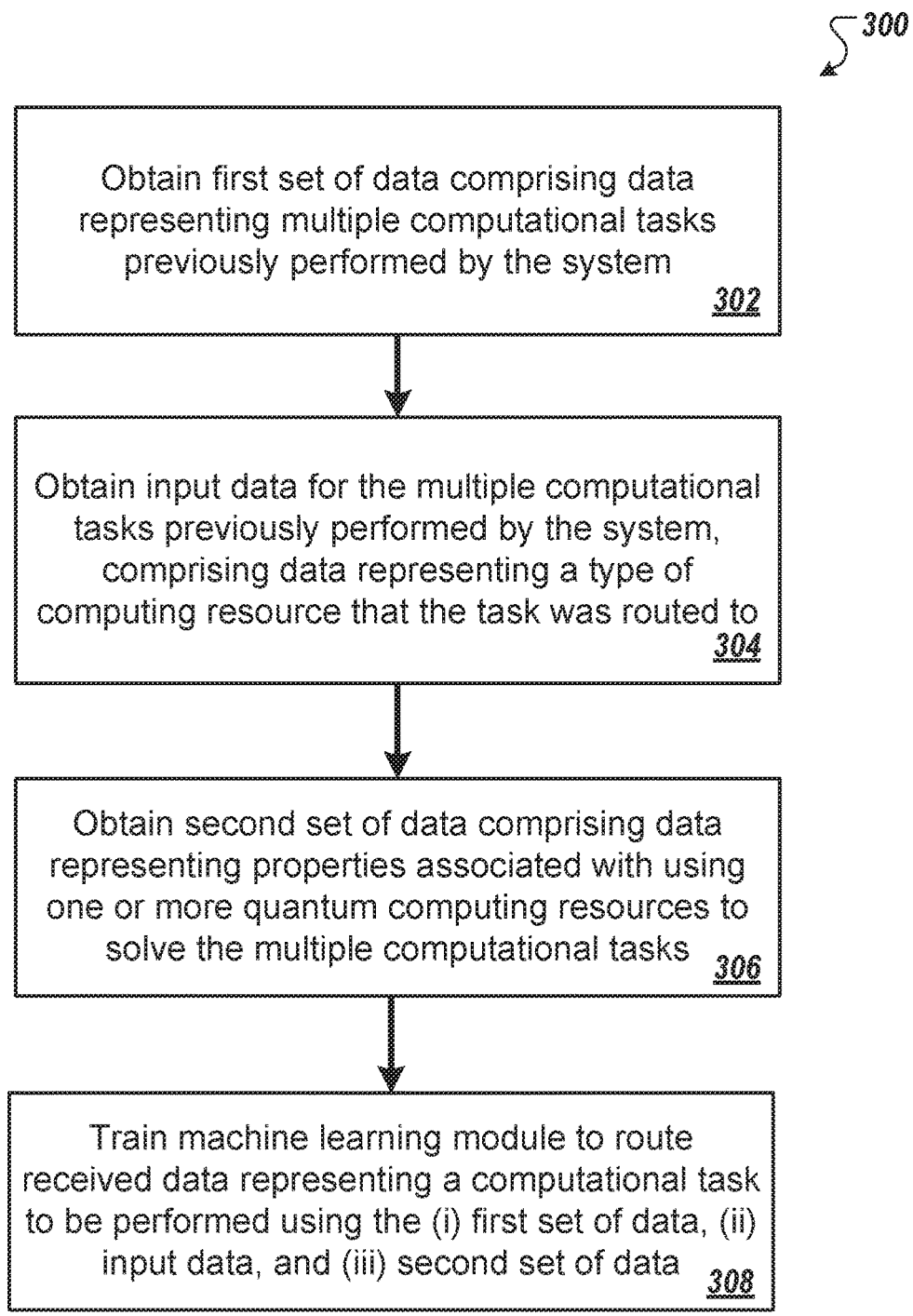
FIG. 3 is a flow diagram of an example process for training a machine learning model to route received computational tasks in a system including one or more quantum computing resources.

FIG. 3 is a flow diagram of an example process 300 for training a machine learning model to route received computational tasks in a system including one or more quantum computing resources. For example, the system may include one or more of (i) quantum gate computers, (ii) adiabatic annealers, or (iii) quantum simulators. In some examples the system may further include one or more classical computing resources, e.g., one or more classical processors or supercomputers. For convenience, the process 300 will be described as being performed by a system of one or more computers located in one or more locations. For example, a machine learning module, e.g., the machine learning module of FIG. 1A, appropriately programmed in accordance with this specification, can perform the process 300.

The system obtains a first set of data, the first set of data including data representing multiple computational tasks previously performed by the system (step 302). In some implementations the multiple computational tasks previously performed by the system may include optimization tasks, e.g., the task of designing a water network that distributes an optimal amount of water or the task of devising a radiation plan to treat a tumor that minimizes collateral damage to tissue and body parts surrounding the tumor. In some implementations, the multiple computational tasks previously performed by the system may include computational tasks such as integer factorization, database search, arithmetic computations, machine learning tasks or video compression. In some implementations, the multiple computational tasks previously performed by the system may include simulation tasks, e.g., the task of simulating chemical reactions, materials or protein folding.

The system obtains input data for the multiple computational tasks previously performed by the system, including data representing a type of computing resource the task was routed to (step 304). For example, previously performed optimization tasks may have been routed to one or more quantum annealers or to one or more classical computers. In this example, the input data may include data representing the optimization task and an identifier of the corresponding quantum annealer or classical computer used to perform the optimization task. As another example, previously performed integer factoring tasks, database search tasks, arithmetic tasks or machine learning tasks may have been routed to one or more quantum gate computers or to one or more classical computers. In this example, the input data may include data representing the integer factoring task or database task and an identifier of the corresponding quantum gate computer or classical computer used to perform the task. As another example, previously performed simulation tasks may have been routed to one or more quantum simulators. In this example, the input data may include data representing the simulation task and an identifier of the corresponding quantum simulator used to perform the simulation task.

In some implementations, the system may obtain input data for multiple computational tasks that were successfully performed by the system, including data representing a type of computing resource the task was routed to. For example, previously performed computational tasks may be assigned a success score, e.g., based on a computational cost, computational efficiency or monetary cost associated with performing the computational task. If an assigned success score is above a predetermined threshold, the obtained input data may include input data for the computational task, including data representing the type of computing resource the task was routed to.

In some implementations, the obtained input data may also include, for each of the computational tasks, data representing a size of an input data set associated with the computational task. For example, the size of an input data set associated with a computational task may include a size of the input data 102 described above with reference to FIGS. 1 and 2. The size of an input data set may be used to determine which computing resource to route the computational task to. For example, some computing resources may be limited as to the size of input data they are configured to receive and/or process. Therefore, a computational task with an associated input data set of a given size should be routed to a computing resource that is capable of receiving and efficiently processing the input data set.

As another example, quantum computing resources may have associated classical overheads when performing computational tasks. In cases where the input data set is small, e.g., easily manageable by a particular quantum computing resource, the classical overhead may negate any benefits achieved by using the quantum computing resource, e.g., in terms of computational time or efficiency. In these cases it may be more efficient to use a classical computer or other quantum computing resource to process the computational task.

As another example, in cases where the input data set is small, e.g., easily manageable by a particular quantum computing resource, the monetary cost of using the quantum computing resource, e.g., an associated rental fee, may negate the benefits of using the quantum computing resource. In these cases it may be more desirable, e.g., to minimize costs associated with performing the computational task, to use a classical computer or other quantum computing resource to process the computational task.

As another example, in cases where the input data set is large, e.g., requiring a long computational processing time, the monetary cost of using a quantum computing resource to perform the computational task may be too large. In these cases it may be more desirable, e.g., in order to minimize costs associated with performing the computational task, to use a classical computer or other quantum computing resource, to process the computational task.

Alternatively or in addition, the obtained input data may also include data indicating whether an input data set associated with the computational task included static, real time or both static and real time input data. Typically, real time data may be likely to have more variability from data point to data point. For example, data signals from an IoT device may indicate dynamic information about a user or component of in a system represented by the optimization task, e.g., a dynamic location of a user or a system component. Such dynamic data, combined with other rapidly changing data signals, may influence how hard a computation is to perform and therefore which computing resource should be used to perform the computation. Static data, e.g., demographics of a user in a system represented by the optimization task or static information about components of a system, may also influence how hard a computation is to perform and therefore which computing resource should be used to perform a computation. For example, some static data may be easier to incorporate in algorithms running on certain computing resources compared to other computing resources, e.g., depending on algorithm sensitivity and the variability of the static data. As another example, a quantum computing device maybe involved in processing certain frames from a real time analysis to provide deeper insights than a classical counterpart. Alternatively, a classical computing device may be used for large scale distributed static data analysis in cases where data movement to a quantum computer would decrease overall result time.

Alternatively or in addition, the obtained input data may also include data representing an error tolerance associated with the computational task. An error tolerance associated with a computational task may be used to determine which computing resource to route the computational task to. For example, some computational tasks may have smaller error tolerances than others, e.g., an error tolerance of a solution to the task of optimizing a cancer radiotherapy treatment may be smaller than an error tolerance of a solution to the task of optimizing the wastage of water in a water network. Computational tasks with smaller error tolerances may therefore be routed to computing resources that are more accurate than other computing resources, e.g., to computing resources who are less likely to introduce errors when performing a computational task.

In some cases machine learning techniques applied to specific use cases may be used to teach the system what an acceptable error tolerance might be. In some cases this may further provide an opportunity for a feedback loop within the system 100 that uses quantum machine learning to not only increase the efficiency and accuracy of the system but then also to effectively deal with anomalies in the data signals being fed into the system.

Alternatively or in addition, the obtained input data may also include data representing a required level of confidence associated with the computational task. For example, certain types of quantum computers will provide a probabilistic rather than a deterministic result, and based on the amount of cycles on the quantum computer the confidence in the result can be increased. A required level of confidence associated with a computational task may be used to determine which computing resource to route the computational task to. For example, some computing resources may be configured to generate solutions to computational tasks that are more likely to be accurate than solutions generated by other computing resources. Solutions to computational tasks that require high levels of confidence may therefore be routed to computing resources that are more likely to produce accurate solutions to the computational tasks. For example, such computational tasks may not be provided to an adiabatic quantum processor that may, in some cases, produce a range of solutions with varying degrees of confidence.

In some implementations the obtained input data for the multiple computational tasks previously performed by the system may include data indicating a frequency of changes to the input data sets associated with each computational tasks. A measure of the frequency of changes to input data sets may be used to determine which computing resource to route the computational task to, i.e., determining which computing resource can keep up with the rate of change of the input data. For example, if changes to input data associated with a computational task are frequent, it may be beneficial to use a quantum computing resource to perform the computational task if the quantum computing resource generates a solution to the computational task faster than a classical computing resource to ensure that a solution to the computational task is obtained before the input data is changed and an updated computational task for the changed input data is received.

The system obtains a second set of data, the second set of data comprising data representing properties associated with using the one or more quantum computing resources to solve the multiple computational tasks (step 306).

In some implementations, properties of using the one or more quantum computing resources to solve the multiple computational tasks may include, for each computational task, approximate qualities of solutions generated by the one or more quantum computing resources. For example, the quantum computing resources may be configured to perform certain computational tasks with certain accuracy, where the accuracy is dependent on the quantum computing resource architecture and the corresponding computational task.

In addition or alternatively, the properties of using the one or more quantum computing resources to solve the multiple computational tasks may include, for each computational task, computational runtimes associated with solutions generated by the one or more quantum computing resources.

In addition or alternatively, the properties of using the one or more quantum computing resources to solve the multiple computational tasks may include, for each computational task, computational costs associated with solutions generated by the one or more quantum computing resources.

In some implementations, data representing properties of using the one or more quantum computing resources to solve multiple computational tasks may further include, for each quantum computing resource, a number of qubits available to the quantum computing resource.

Alternatively or in addition, the properties of using the one or more quantum computing resources to solve multiple computational tasks may further include, for each quantum computing resource, a cost, e.g., a usage fee, associated with using the quantum computing resource. For example, a quantum computing resource may have an associated pricing model that varies depending on the demand at the time of the day. Such a pricing model may be a factor to be considered when determining which computing resource to use to solve an optimization task.

The system trains the machine learning model to route received data representing a computational task to be performed using the (i) first set of data, (ii) input data, and (iii) second set of data (step 308). In some implementations the system may train the machine learning model to route received computational tasks by generating a set of training examples using the (i) first set of data as described above with reference to step 302, (ii) the input data, as described above with reference to step 304, and (iii) the second set of data, as described above with reference to step 306. Each training example in the set of training examples may include a machine learning model input paired with a known machine learning model output. In some cases the training examples may be initially generated from combining data from independent quantum computing resource execution logs and classical computing resource execution logs. Subsequent training examples may then be built using said execution logs together with data capture from the system itself. In this manner, the system may be continually updated to account for model drift, e.g., as costs associated with computations and processing capability change over time.

The system may then train the machine learning model using the set of training examples. For example, the system may process each machine learning model input to generate a respective machine learning model output, compute a loss function between the generated machine learning model output and the known machine learning model, and back-propagate gradients to adjust machine learning model parameters from initial values to trained values.

Figure 4:
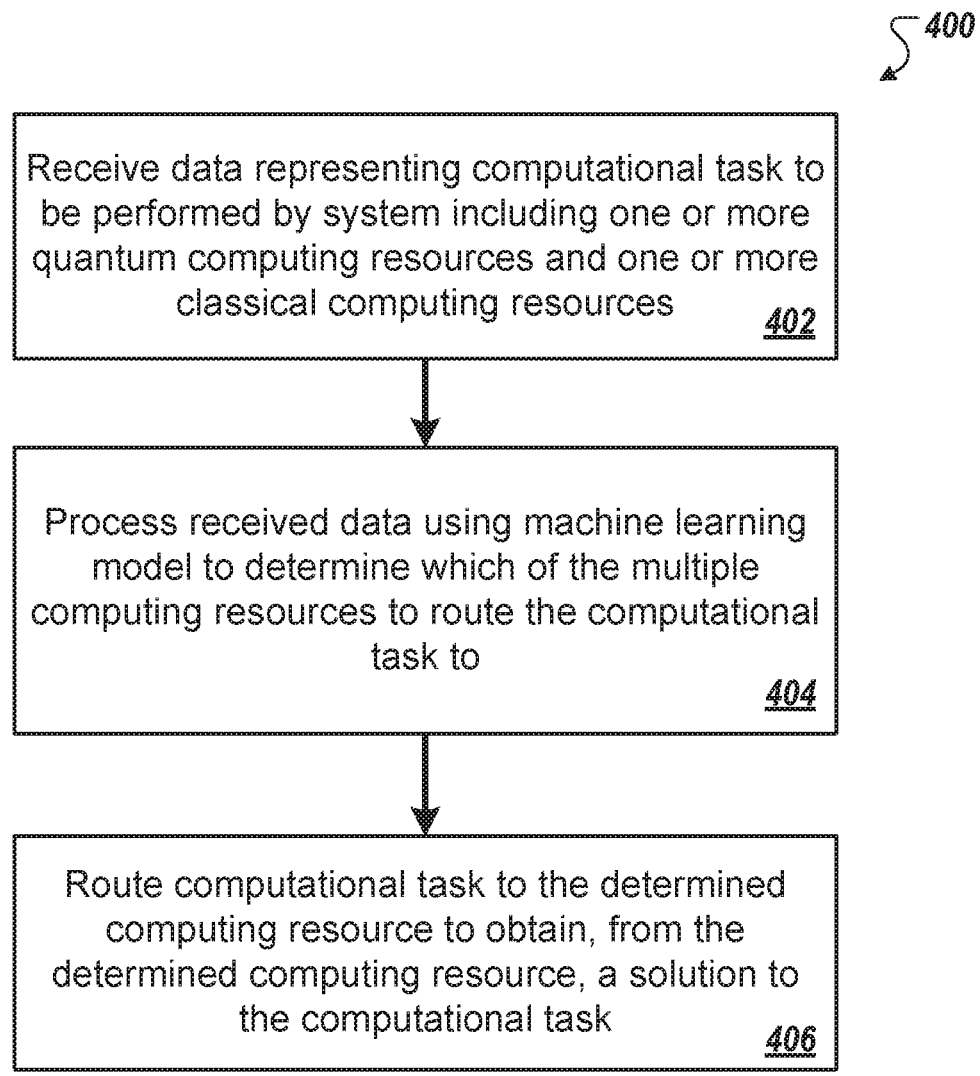
FIG. 4 is a flow diagram of an example process for obtaining a solution to a computational task using a system including one or more quantum computing resources.

FIG. 4 is a flow diagram of an example process 400 for obtaining a solution to a computational task using a system including one or more quantum computing resources. For convenience, the process 400 will be described as being performed by a system of one or more computers located in one or more locations. For example, a system for performing computational tasks, e.g., the system 100 of FIG. 1A, appropriately programmed in accordance with this specification, can perform the process 400.

The system receives data representing a computational task to be performed by a system including one or more quantum computing resources, e.g., one or more quantum gate computers, adiabatic annealers, or quantum simulators, and one or more classical computing resources, e.g., one or more classical computers or super computers (step 402).

The system processes the received data using a machine learning model to determine which of the one or more quantum computing resources or the one or more classical computing resources to route the data representing the computational task to (step 404). As described above with reference to FIG. 2, the machine learning model is a predictive model that has been configured through training to route received data representing computational tasks to be performed in the system including at least one quantum computing resource.

As an example, the machine learning model may be part of a collision avoidance system in a driverless car. In this case, the machine learning model may have been trained to avoid collisions using a set of training examples, e.g., generated using the data signals described above. During runtime, the driverless car may be approaching an intersection populated by cars driven by humans. The machine learning module may receive and process data inputs to determine whether a collision is imminent or not. Some of the data inputs may include static data inputs, e.g., driverless vehicle weight, friction coefficient of the tires at current temperature/humidity. In some cases the static inputs may also include data inputs relating to other vehicles at the intersection, e.g., including human characteristics of drivers of the other vehicles (and therefore their likely behavior) based on observations. Some of the data inputs may include dynamic data, e.g., current speed, velocity, humidity, intensity of sunlight shining in the eyes of the other vehicles that might be blinding them and adding milliseconds to reaction time, to name a few. The machine learning model may have been using such data inputs at previous times to learn characteristics of the driving vehicle. For example, the machine learning model may have learned that the brake system applied 78% stopping power on a same sort of road surface in the past and that the vehicle responded with a stopping distance of 24 meters. The machine learning model may use this information to determine an appropriate reaction in the current time. For example, the machine learning model may determine that, in a current emergency situation, the driverless vehicle needs to turn 30 degrees to the left and brake within 19 meters to avoid a collision. Determining whether to take this emergency action or not may be time critical. The machine learning model may therefore determine that the short amount of time is too short to call a cloud-based quantum machine. Instead, the machine learning model may determine that in this instance it is more effective to use cached information from previous calculations and/or route the decision task to a local Newtonian processor.

The system routes the data representing the computational task to the determined computing resource to obtain, from the determined computing resource, data representing a solution to the computational task (step 406).

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer implemented method for training a machine learning model to route received computational tasks in a system including at least one quantum computing resource and at least one classical computing resource, the method comprising:

obtaining, from a cache, a first set of data, the first set of data comprising data representing multiple computational tasks previously performed by the system;

obtaining, from a database, a second set of data, the second set of data comprising data representing properties associated with using the one or more quantum computing resources to solve the multiple computational tasks;

obtaining, from a cache, input data for the multiple computational tasks previously performed by the system, comprising data representing a type of computing resource the task was routed to;

accessing, at a training example generator, the first set of data, the second set of data, and the input data;

generating, at the training example generator, a set of training examples;

training the machine learning model, using the set of training examples, to route received data representing a computational task to be performed;

providing the trained machine learning model to a system including at least one quantum computing resource to route computational tasks received by the system to the at least one quantum computing resource and the at least one classical computing resource;

receiving, at the trained machine learning module, data representing a computational task to be performed by a system including one or more quantum computing resources and one or more classical computing resources;

processing the received data using the trained machine learning model to determine to which of the one or more quantum computing resources or the one or more classical computing resources to route the data representing the computational task;

routing, by the machine learning module, the data representing the computational task to the determined computing resource;

obtaining at the machine learning module and from the determined computing resource, data representing a solution to the computational task;

generating output data including data representing a solution to the computational task; and receiving, at a broker, the output data and generating one or more actions to be taken.

2. The method of claim 1, wherein the quantum computing resources comprise one or more of (i) quantum gate computers, (ii) adiabatic annealers, or (iii) quantum simulators.

3. The method of claim 1, wherein the system further comprises one or more classical computing resources.

4. The method of claim 1, wherein the computational tasks comprise optimization tasks.

5. The method of claim 1, wherein properties of using the one or more quantum computing resources to solve the multiple computational tasks comprise, for each computational task, one or more of:
   (i) approximate qualities of solutions generated by the one or more quantum computing resources;
   (ii) computational times associated with solutions generated by the one or more quantum computing resources; or
   (iii) computational costs associated with solutions generated by the one or more quantum computing resources.

6. The method of claim 5, wherein data representing properties of using the one or more quantum computing resources to solve multiple computational tasks further comprises, for each quantum computing resource, one or more of
   (i) a number of qubits available to the quantum computing resource; and
   (ii) a cost associated with using the quantum computing resource.

7. The method of claim 1, wherein the obtained input data for the multiple computational tasks previously performed by the system further comprises, for each computational task, one or more of:
   (i) data representing a size of an input data set associated with the computational task;
   (ii) data indicating whether an input data set associated with the computational task comprised static, real time or both static and real time input data;
   (iii) data representing an error tolerance associated with the computational task; and
   (iv) data representing a required level of confidence associated with the computational task.

8. The method of claim 1, wherein the obtained input data for the multiple computational tasks previously performed by the system further comprises data indicating a frequency of changes to the input data sets associated with each computational tasks.

9. The method of claim 1, wherein each training example comprises a machine learning model input paired with a known machine learning model output.

10. A computer implemented method for obtaining a solution to a computational task, the method comprising:
    receiving, at a machine learning module, data representing a computational task to be performed by a system including one or more quantum computing resources and one or more classical computing resources;
    processing the received data using the machine learning model to determine which of the one or more quantum computing resources or the one or more classical computing resources to route the data representing the computational task to, wherein the machine learning model has been configured through training to route received data representing computational tasks to be performed in a system including at least one quantum computing resource;
    routing, by the machine learning module, the data representing the computational task to the determined computing resource;
    processing, by the determined computing resource, the data representing the computational task to generate data representing a solution to the computational task;
    obtaining at the machine learning module and from the determined computing resource, data representing a solution to the computational task;
    generating output data including data representing a solution to the computational task; and
    receiving, at a broker, the output data and generating one or more actions to be taken.

11. The method of claim 10, wherein the quantum computing resources comprise one or more of (i) quantum gate computers, (ii) adiabatic annealers, or (iii) quantum simulators.

12. The method of claim 10, wherein the computational tasks comprise optimization tasks.

13. The method of claim 10, wherein training the machine learning model to route received data representing computational tasks to be performed comprises training the machine learning model using (i) data representing multiple computational tasks previously performed by the system, and (ii) data representing a type of computing resource the task was routed to.

14. The method of claim 13, wherein the data representing multiple computational tasks previously performed by the system comprises, for each computational task, one or more of:
    (i) data representing a size of an input data set associated with the computational task;
    (ii) data indicating whether an input data set associated with the computational task comprised static, real time or both static and real time input data;
    (iii) data representing an error tolerance associated with the computational task; and
    (iv) data representing a required level of confidence associated with the computational task.

15. The method of claim 13, wherein the data representing multiple computational tasks previously performed by the system comprises data indicating a frequency of changes to input data sets associated with each computational tasks.

16. The method of claim 13, further comprising training the machine learning model using data representing properties associated with using the one or more quantum computing resources to solve the multiple computational tasks.

17. The method of claim 16, wherein properties associated with using the one or more quantum computing resources to solve the multiple computational tasks comprise:
    for each computational task, one or more of:
      (i) approximate qualities of solutions generated by the one or more quantum computing resources;
      (ii) computational times associated with solutions generated by the one or more quantum computing resources; or
      (iii) computational costs associated with solutions generated by the one or more quantum computing resources, and
    for each quantum computing resource, one or more of (i) a number of qubits available to the quantum computing resource; and
(ii) a cost associated with using the quantum computing resource.

18. A system comprising one or more computers and one or more storage devices storing instructions that are operable, when executed by the one or more computers, to cause the one or more computers to perform operations comprising:
receiving, at a machine learning module, data representing a computational task to be performed by a system including one or more quantum computing resources and one or more classical computing resources;
processing the received data using the machine learning model to determine to which of the one or more quantum computing resources or the one or more classical computing resources to route the data representing the computational task, wherein the machine learning model has been configured through training to route received data representing computational tasks to be performed in a system including at least one quantum computing resource;
routing, by the machine learning module, the data representing the computational task to the determined computing resource;
processing, by the determined computing resource, the data representing the computational task to generate data representing a solution to the computational task;
obtaining, at the machine learning module and from the determined computing resource, data representing a solution to the computational task;
generating output data including data representing a solution to the computational task; and
receiving, at a broker, the output data and generating one or more actions to be taken.

19. The system of claim 18, wherein the quantum computing resources comprise one or more of (i) quantum gate computers, (ii) adiabatic annealers, or (iii) quantum simulators.

20. The system of claim 18, wherein training the machine learning model to route received data representing computational tasks to be performed comprises training the machine learning model using (i) data representing multiple computational tasks previously performed by the system, (ii) data representing a type of computing resource the task was routed to, and (iii) data representing properties associated with using the one or more quantum computing resources to solve the multiple computational tasks.

* * * * *